(12) United States Patent
Yamanaka

(10) Patent No.: US 11,505,277 B1
(45) Date of Patent: Nov. 22, 2022

(54) CRANK ARM FOR CRANK ASSEMBLY OF HUMAN POWERED VEHICLE

(71) Applicant: SHIMANO INC., Sakai (JP)

(72) Inventor: Masahiro Yamanaka, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/568,689

(22) Filed: Jan. 4, 2022

(51) Int. Cl.
*B62M 3/00* (2006.01)

(52) U.S. Cl.
CPC ...................................... *B62M 3/00* (2013.01)

(58) Field of Classification Search
CPC ...... B62M 3/00; B62M 3/003; Y10T 74/2164
USPC .............................................. 74/594.1, 594.2
See application file for complete search history.

(56) References Cited

U.S. PATENT DOCUMENTS

| 626,227 | A | | 6/1899 | Gaylor | |
|---|---|---|---|---|---|
| 4,150,859 | A | | 4/1979 | Segawa et al. | |
| 4,300,411 | A | | 11/1981 | Segawa | |
| 4,630,503 | A | | 12/1986 | Liu | |
| 4,704,919 | A | * | 11/1987 | Durham | B62M 3/003 74/594.1 |
| 5,010,785 | A | * | 4/1991 | Romero | B62M 3/00 74/594.1 |
| 5,440,950 | A | * | 8/1995 | Tranvoiz | B62M 3/08 74/594.1 |
| 2004/0154431 | A1 | * | 8/2004 | Yamanaka | B25B 27/0071 74/594.1 |
| 2005/0040699 | A1 | | 2/2005 | Chiang et al. | |
| 2014/0157948 | A1 | * | 6/2014 | Onogi | B62J 45/41 74/594.1 |
| 2019/0308689 | A1 | * | 10/2019 | Kitahara | B62M 6/55 |

FOREIGN PATENT DOCUMENTS

| CN | 201043006 Y | 4/2008 | |
|---|---|---|---|
| DE | 102013103288 A1 * | 3/2014 | ............. B62M 3/00 |
| EP | 1426282 | 6/2004 | |
| FR | 923227 | 7/1947 | |

* cited by examiner

*Primary Examiner* — Vinh Luong
(74) *Attorney, Agent, or Firm* — Mori & Ward, LLP

(57) ABSTRACT

A crank arm comprises an arm body, an axle fastener, and a biasing element. The arm body includes a crank-axle receiving opening and an axle-fastener receiving opening. The axle-fastener receiving opening has a second opening axis. The axle-fastener receiving opening is partly in communication with the crank-axle receiving opening by a connection opening. The axle fastener includes a fastener body having a splined portion. The splined portion is configured to engage with the splined end of the crank axle in a mounted state where the crank arm is mounted to the crank axle. The biasing element is configured to bias the axle fastener in a biasing direction parallel to the second opening axis.

11 Claims, 16 Drawing Sheets

CRANK ARM FOR CRANK ASSEMBLY OF HUMAN POWERED VEHICLE

BACKGROUND

Technical Field

The present invention relates to a crank arm for a crank assembly of a human powered vehicle.

Background Information

A human powered vehicle includes a crank assembly. The crank assembly includes a crank arm and a crank axle. The crank arm is fastened to the crank axle. For example, the crank arm having a fastening opening and a slit is fastened to the crank axle with crank arm bolts (see e.g., EP Pub. No. 1426282A2). Furthermore, the crank arm can be fastened to the crank arm with a bolt and a plurality of parts ((see e.g., U.S. Pub. No. 2005/0040699). In the fastening structure of U.S. Pub. No. 2005/0040699, the fastening force between the crank 10 and the axle 30 can be insufficient because the tubular members 21 have no splined portion to engage with the splined end 31 of the axle 30. It is preferable to make it easier to assemble the crank assembly, to improve rigidity of the crank arm, and/or to improve an appearance of the crank arm.

SUMMARY

In accordance with a first aspect of the present invention, a crank arm for a crank assembly of a human powered vehicle comprises an arm body, an axle fastener, and a biasing element. The arm body includes a crank-axle receiving opening and an axle-fastener receiving opening. The crank-axle receiving opening has a first opening axis and a splined inner periphery configured to receive and engage with a splined end of a crank axle. The axle-fastener receiving opening has a second opening axis that is non-parallel to the first opening axis. The axle-fastener receiving opening is partly in communication with the crank-axle receiving opening by a connection opening. The axle fastener is configured to be inserted into the axle-fastener receiving opening and includes a fastener body having a splined portion. The splined portion is configured to engage with the splined end of the crank axle in a mounted state where the crank arm is mounted to the crank axle. The biasing element is configured to bias the axle fastener in a biasing direction parallel to the second opening axis. The splined portion of the fastener body is configured to overlap with the connection opening in an inserted state where the axle fastener is inserted into the axle-fastener receiving opening, so as to engage with the splined end of the crank axle.

With the crank arm according to the first aspect, the biasing element is configured to bias the axle fastener in a state where the splined portion of the fastener body engages with the splined end of the crank axle. This makes it easier to fasten the crank arm to the crank axle and/or makes it possible to omit a slit included in a comparative example of an arm body. Thus, it is possible to improve assembling of the crank assembly, to improve rigidity of the crank arm because of the spline-engagement between the fastener body of the axle fastener and the splined end of the crank axle, and/or to improve an appearance of the crank arm.

In accordance with a second aspect of the present invention, the crank arm according to the first aspect is configured so that the first opening axis of the crank-axle receiving opening is perpendicular to the second opening axis of the axle-fastener receiving opening when viewed from a projective direction that is radially defined with respect to the first opening axis and perpendicular to the second opening axis.

With the crank arm according to the second aspect, the positional relationship between the first opening axis and the second opening axis can efficiently transmit biasing force of the biasing element to the engagement part between the splined portion of the axle fastener and the splined end of the crank arm. This reliably makes it easier to fasten the crank arm to the crank axle.

In accordance with a third aspect of the present invention, the crank arm according to the first or second aspect further comprises an axle bolt. The axle bolt includes a bolt body and a radial projection. The bolt body has external threads configured to threadedly engage with internal threads of the crank axle in the mounted state. The radial projection extends radially outwardly from the bolt body with respect to the first opening axis and is configured to abut against the arm body in an axial direction with respect to the first opening axis in the mounted state.

With the crank arm according to the third aspect, the axle bolt can effectively restrict movement of the crank arm relative to the crank axle in the axial direction.

In accordance with a fourth aspect of the present invention, the crank arm according to any one of the first to third aspects is configured so that the axle fastener further includes a positioning structure configured to position the fastener body in the inserted state.

With the crank arm according to the fourth aspect, the positioning structure can position the fastener body in an engagement position where the splined portion of the axle fastener is engageable with the splined end of the crank axle.

In accordance with a fifth aspect of the present invention, the crank arm according to the fourth aspect is configured so that the positioning structure includes a movable member, a biasing member, and a receiving chamber. The biasing member is configured to bias the movable member in a direction away from the fastener body. The receiving chamber is formed to the fastener body and is configured to receive the movable member and the biasing member.

With the crank arm according to the fifth aspect, the positioning structure can reliably position the fastener body in the engagement position.

In accordance with a sixth aspect of the present invention, the crank arm according to the fifth aspect is configured so that the positioning structure further includes a receiving recess formed to the arm body and configured to receive the movable member.

With the crank arm according to the sixth aspect, the positioning structure can more reliably position the fastener body in the engagement position.

In accordance with a seventh aspect of the present invention, the crank arm according to the fourth aspect is configured so that the positioning structure includes an elastic ring and an annular groove formed to the fastener body and configured to receive the elastic ring.

With the crank arm according to the seventh aspect, the positioning structure can reliably position the fastener body in the engagement position with less number of parts of the positioning structure.

In accordance with an eighth aspect of the present invention, the crank arm according to any one of the first to seventh aspects is configured so that the biasing direction is a direction opposite to a rotational driving direction of the crank arm.

With the crank arm according to the eighth aspect, it is possible to reliably fasten the crank arm to the crank axle.

In accordance with a ninth aspect of the present invention, the crank arm according to any one of the first to eighth aspects is configured so that the fastener body of the axle fastener is formed as a unitary, one-piece member.

With the crank arm according to the ninth aspect, it is possible to reduce the number of part of the crank arm. Thus, it is possible to save weight of the crank arm and/or to reduce a manufacturing cost of the crank arm.

In accordance with a tenth aspect of the present invention, the crank arm according to the ninth aspect is configured so that the biasing element is contactable with one end of the fastener body of the axle fastener to bias the fastener body of the axle fastener in the biasing direction.

With the crank arm according to the tenth aspect, it is possible to reliably reduce the number of part of the crank arm. Thus, it is possible to save weight of the crank arm and/or to reduce a manufacturing cost of the crank arm.

In accordance with an eleventh aspect of the present invention, the crank arm according to any one of the first to tenth aspects is configured so that the biasing element has external threads. The arm body has internal threads formed in the axle-fastener receiving opening and configured to threadedly engage with the external threads of the biasing element.

With the crank arm according to the eleventh aspect, it is possible to reliably fasten the crank arm to the crank axle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
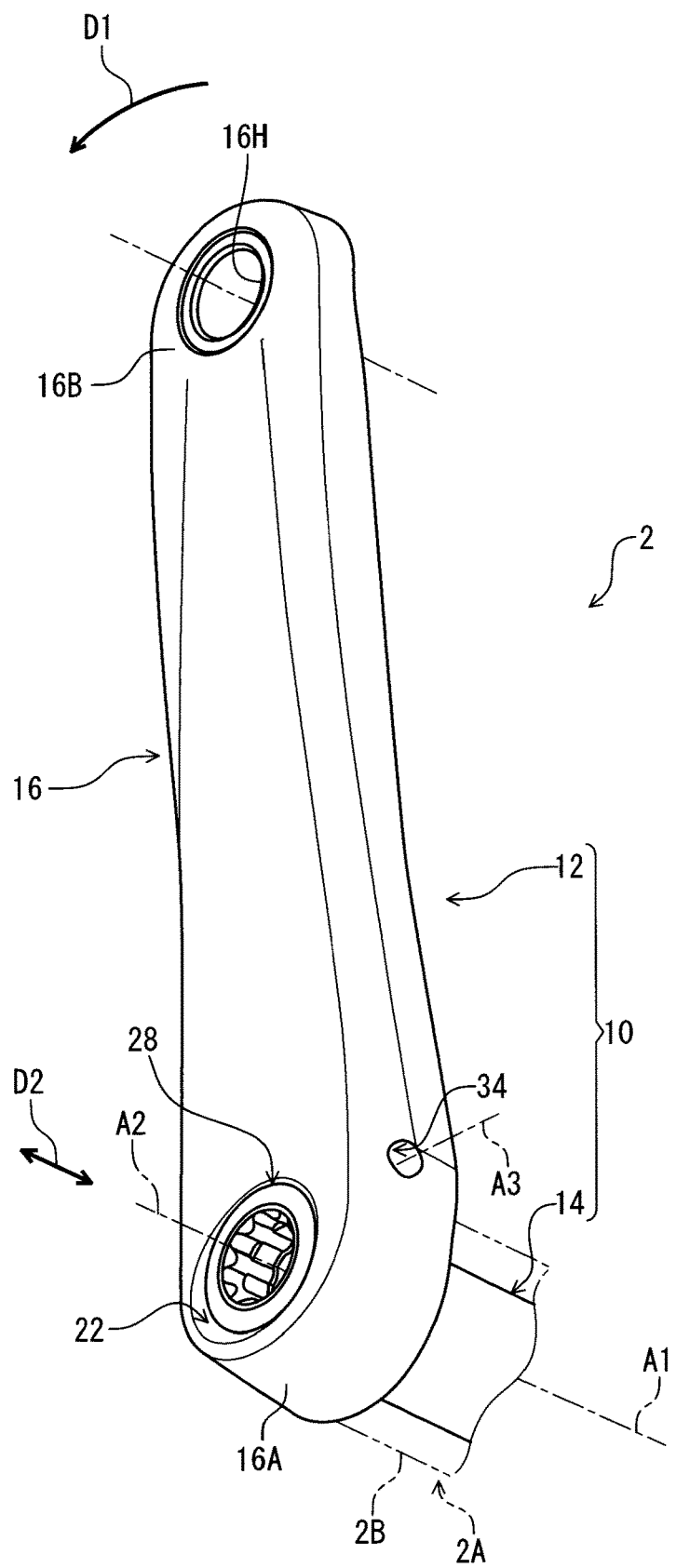
FIG. 1 is a perspective view of a crank assembly including a crank arm in accordance with a first embodiment.

The embodiment(s) will now be described with reference to the accompanying drawings, wherein like reference numerals designate corresponding or identical elements throughout the various drawings.

First Embodiment

As seen in FIG. 1, a crank assembly 10 for a human powered vehicle 2 is rotatable relative to a vehicle body 2A about a rotational axis A1. The crank assembly 10 is configured to be rotated relative to the vehicle body 2A about the rotational axis A1 in a rotational driving direction D1 during pedaling. The crank assembly 10 includes a crank arm 12 and a crank axle 14. The crank axle 14 extends along the rotational axis A1. The crank arm 12 is fastened to the crank axle 14. The crank arm 12 is fastened to an end of the crank axle 14. The crank assembly 10 includes an additional crank arm (not shown) fastened to another end of the crank axle 14. In the first embodiment, the crank arm 12 is a left crank arm. However, the structure of the crank arm 12 can be applied to a right crank arm if needed and/or desired.

In the present application, a human powered vehicle is a vehicle to travel with a motive power including at least a human power of a user who rides the human powered vehicle (i.e., rider). The human powered vehicle includes a various kind of bicycles such as a mountain bike, a road bike, a city bike, a cargo bike, a hand bike, and a recumbent bike. Furthermore, the human powered vehicle includes an electric bike (E-bike). The electric bike includes an electrically assisted bicycle configured to assist propulsion of a vehicle with an electric motor. However, a total number of wheels of the human powered vehicle is not limited to two. For example, the human powered vehicle includes a vehicle having one wheel or three or more wheels. Especially, the human powered vehicle does not include a vehicle that uses only an internal-combustion engine as motive power. Generally, a light road vehicle, which includes a vehicle that does not require a driver's license for a public road, is assumed as the human powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human powered vehicle 2 with facing a handlebar or a steering. Accordingly, these terms, as utilized to describe the crank assembly 10, the crank arm 12, or other components, should be interpreted relative to the human powered vehicle 2 equipped with the crank assembly 10, the crank arm 12, or other components as used in an upright riding position on a horizontal surface.

As seen in FIG. 1, the crank arm 12 for the crank assembly 10 of the human powered vehicle 2 comprises an arm body 16. The arm body 16 includes a first longitudinal end 16A and a second longitudinal end 16B. The arm body 16 extends between the first longitudinal end 16A and the second longitudinal end 16B. The first longitudinal end 16A is fastened to the crank axle 14. The first longitudinal end 16A of the arm body 16 is fastened to an end of the crank axle 14. The arm body 16 includes a pedal-attachment hole 16H to which a pedal is to be rotatably coupled. The second longitudinal end 16B includes the pedal-attachment hole 16H.

Figure 2:
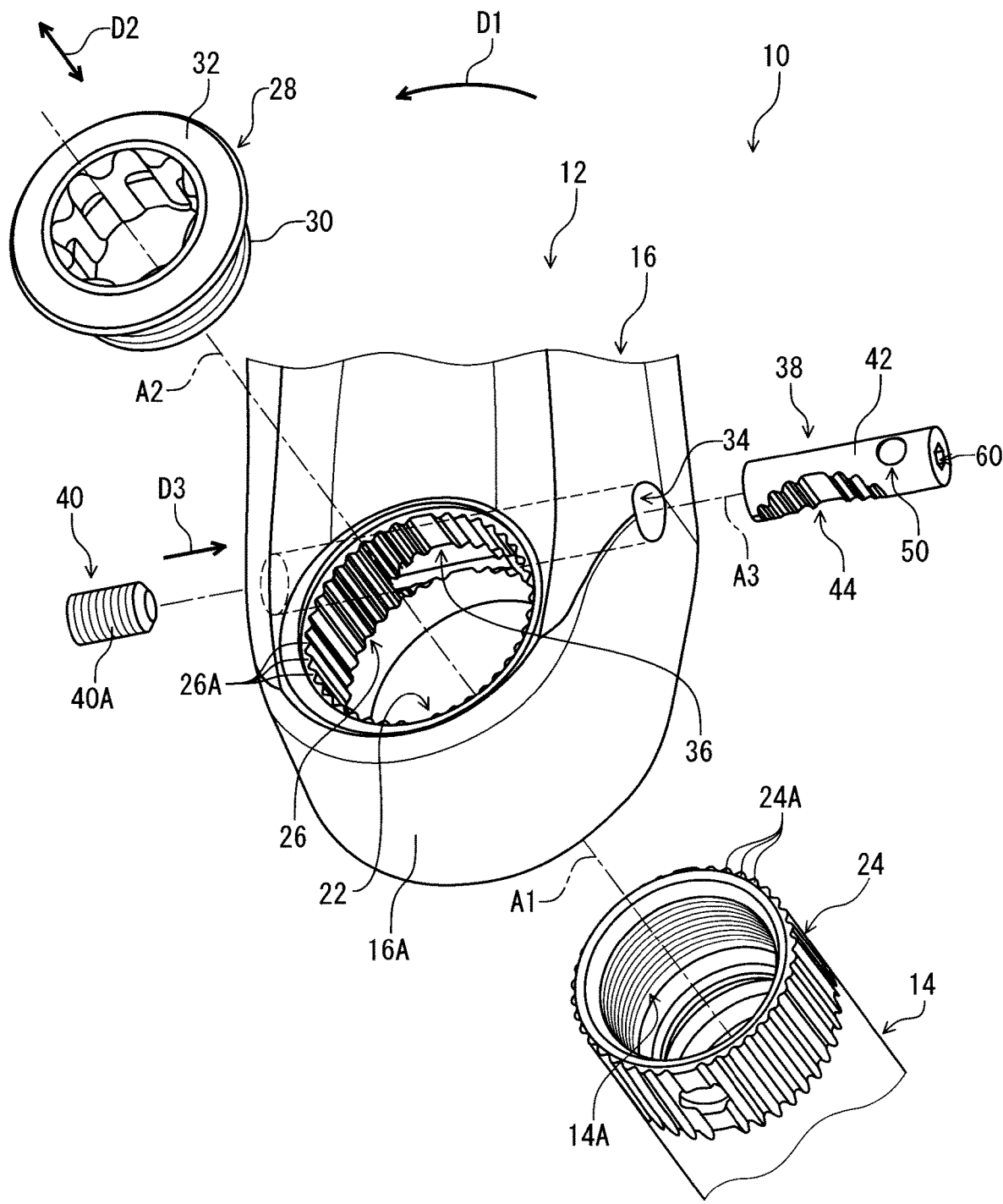
FIG. 2 is an exploded perspective view of the crank assembly illustrated in FIG. 1.

As seen in FIG. 2, the arm body 16 includes a crank-axle receiving opening 22. The crank axle 14 includes a splined end 24. The crank-axle receiving opening 22 has a first opening axis A2 and a splined inner periphery 26. The splined inner periphery 26 is configured to receive and engage with the splined end 24 of the crank axle 14. The splined inner periphery 26 at least partly defines the crank-axle receiving opening 22. The first opening axis A2 is coincident with the rotational axis A1 of the crank assembly 10 in a state where the crank assembly 10 is rotatably mounted to the vehicle body 2A of the human powered vehicle 2. The first longitudinal end 16A of the arm body 16 is free of a slit extending radially outwardly from the crank-axle receiving opening 22 to an outer surface of the first longitudinal end 16A.

The splined inner periphery 26 includes a plurality of internal teeth 26A circumferentially arranged about the first opening axis A2. The plurality of internal teeth 26A at least partly defines the crank-axle receiving opening 22. The splined end 24 includes a plurality of external teeth 24A circumferentially arranged about the first opening axis A2.

Figure 3:
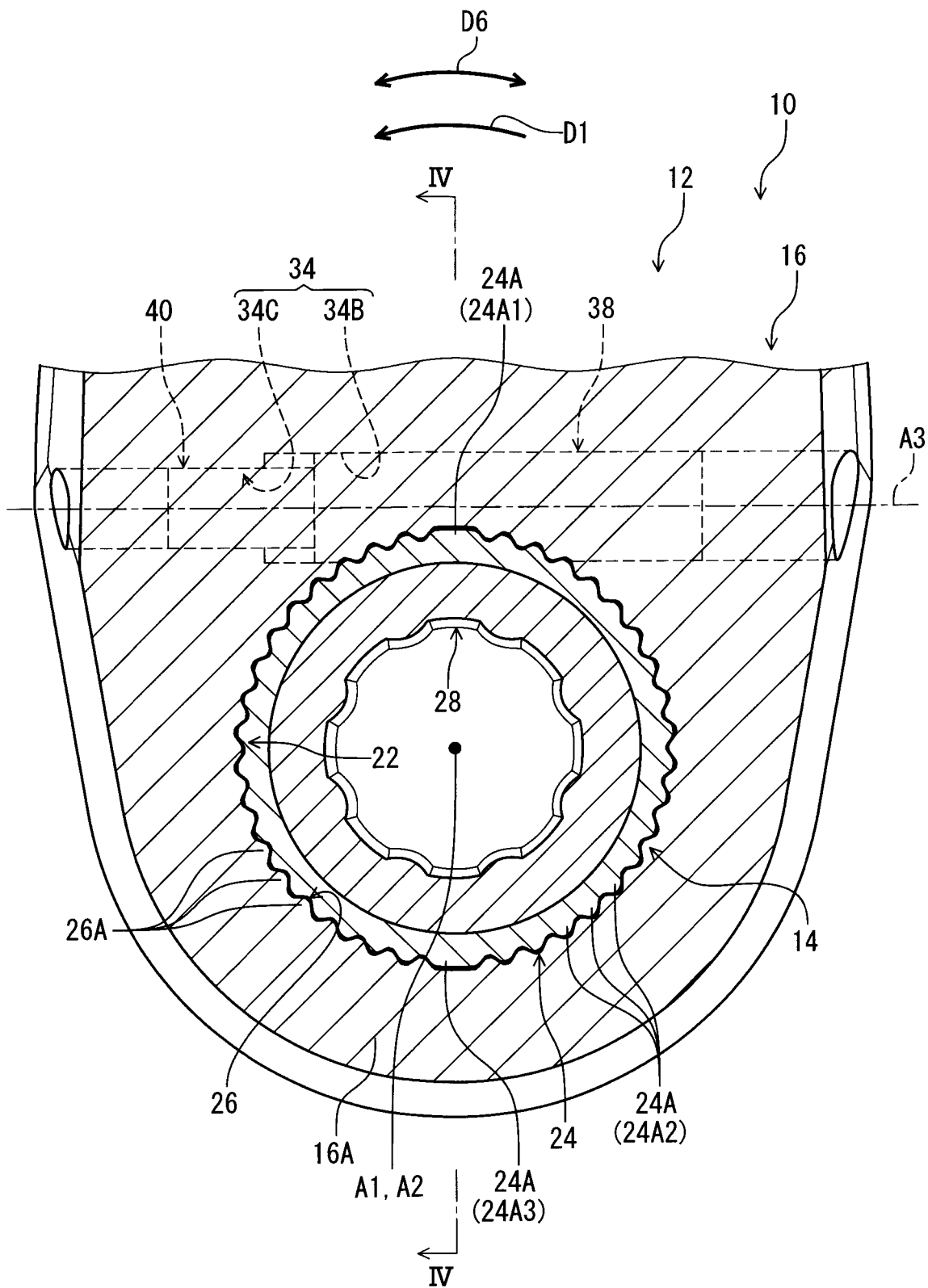
FIG. 3 is a cross-sectional view of the crank assembly taken along line III-III of FIG. 4.

As seen in FIG. 3, the plurality of internal teeth 26A of the splined inner periphery 26 is configured to mesh with the plurality of external teeth 24A of the splined end 24 of the crank axle 14. In the first embodiment, a total number of the plurality of internal teeth 26A of the splined inner periphery 26 is equal to a total number of the plurality of external teeth 24A of the splined end 24. The total number of the plurality of internal teeth 26A of the splined inner periphery 26 is 38. The total number of the plurality of external teeth 24A of the splined end 24 is 38.

However, the total number of the plurality of internal teeth 26A of the splined inner periphery 26 can be different from the total number of the plurality of external teeth 24A of the splined end 24 if needed and/or desired. The total number of the plurality of internal teeth 26A of the splined inner periphery 26 can be less or greater than the total number of the plurality of external teeth 24A of the splined end 24 if needed and/or desired. The total number of the plurality of internal teeth 26A of the splined inner periphery 26 is not limited to the above number. The total number of the plurality of external teeth 24A of the splined end 24 is not limited to the above number.

As seen in FIG. 2, the crank arm 12 further comprises an axle bolt 28. The axle bolt 28 is configured to restrict the arm body 16 from moving relative the crank axle 14 along the rotational axis A1. The axle bolt 28 is configured to be attached to the crank axle 14. The axle bolt 28 is configured to be attached to the splined end 24 of the crank axle 14. The crank axle 14 includes internal threads 14A. The splined end 24 includes the internal threads 14A. The axle bolt 28 is configured to threadedly engage with the internal threads 14A of the crank axle 14.

Figure 4:
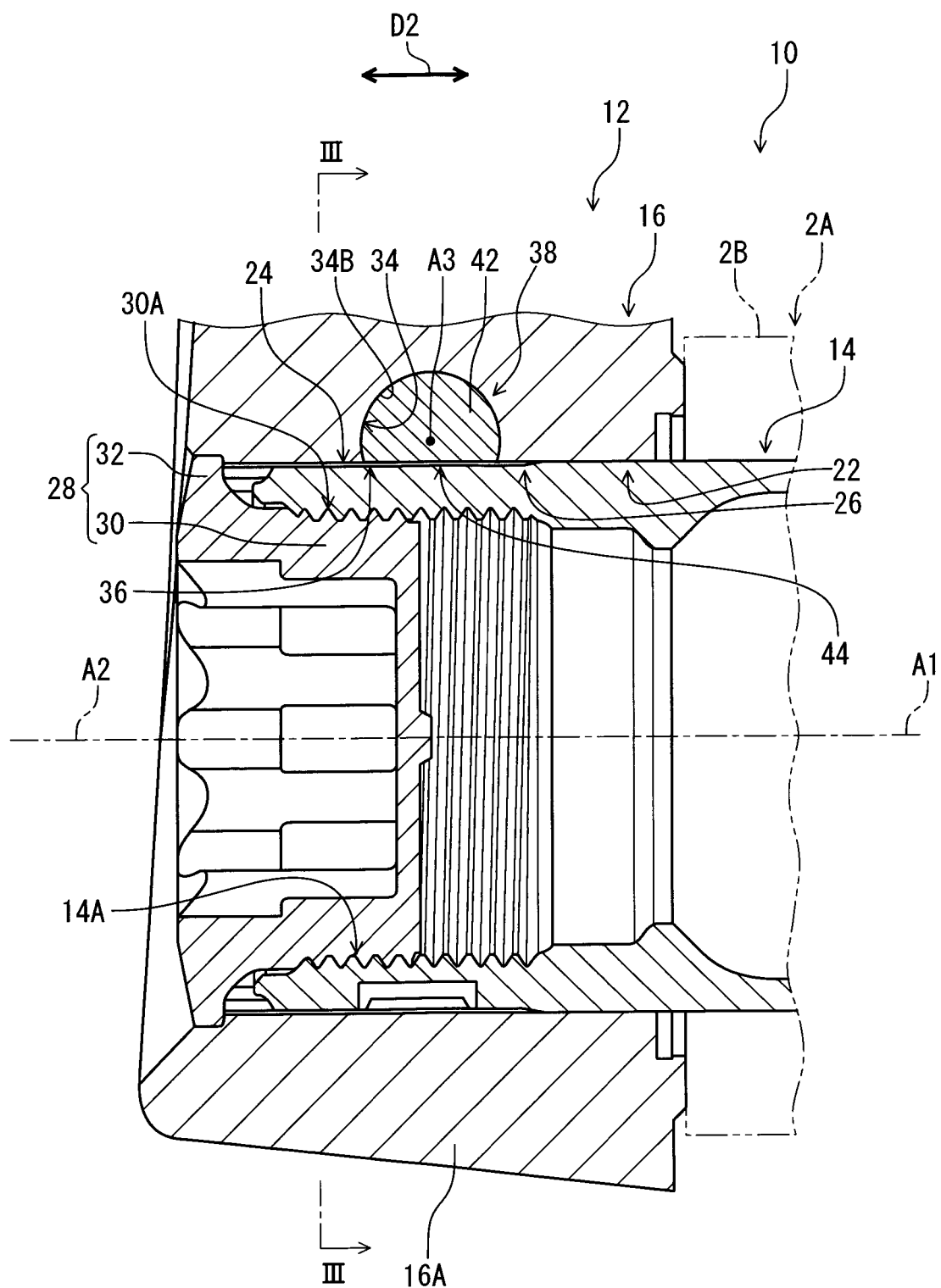
FIG. 4 is a cross-sectional view of the crank assembly taken along line IV-IV of FIG. 3.

As seen in FIG. 4, the axle bolt 28 includes a bolt body 30 and a radial projection 32. The bolt body 30 has external threads 30A configured to threadedly engage with the internal threads 14A of the crank axle 14 in a mounted state where the crank arm 12 is mounted to the crank axle 14. The radial projection 32 extends radially outwardly from the bolt body 30 with respect to the first opening axis A2. The radial projection 32 is configured to abut against the arm body 16 in an axial direction D2 with respect to the first opening axis A2 in the mounted state. Thus, the arm body 16 is held between the axle bolt 28 and a bottom bracket 2B of the vehicle body 2A in the axial direction D2. At least one spacer can be disposed between the arm body 16 and the bottom bracket 2B in the axial direction D2 if needed and/or desired.

As seen in FIG. 2, the arm body 16 includes an axle-fastener receiving opening 34. The axle-fastener receiving opening 34 has a second opening axis A3 that is non-parallel to the first opening axis A2. The axle-fastener receiving opening 34 is partly in communication with the crank-axle receiving opening 22 by a connection opening 36. The axle-fastener receiving opening 34 is connected with the crank-axle receiving opening 22 via the connection opening 36. The connection opening 36 is provided on the splined inner periphery 26 of the arm body 16.

The crank arm 12 for the crank assembly 10 of the human powered vehicle 2 comprises an axle fastener 38 and a biasing element 40. The axle fastener 38 is configured to be inserted into the axle-fastener receiving opening 34. The biasing element 40 is configured to be inserted into the axle-fastener receiving opening 34.

Figure 5:
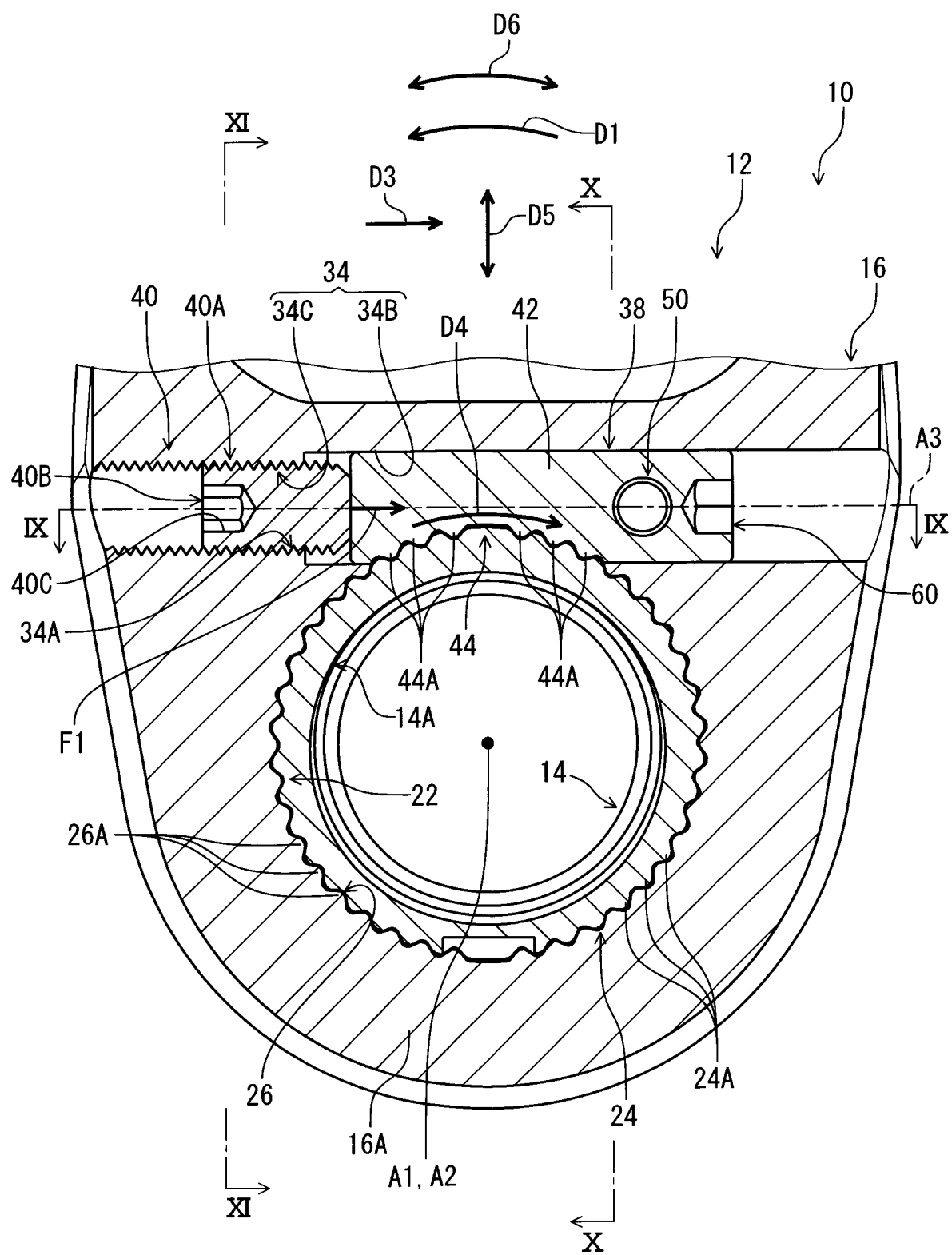
FIG. 5 is a cross-sectional view of the crank assembly taken along line V-V of FIG. 9.

As seen in FIG. 5, the axle fastener 38 is configured to engage with the splined end 24 of the crank axle 14 in an inserted state where the axle fastener 38 is inserted into the axle-fastener receiving opening 34. The biasing element 40 is configured to bias the axle fastener 38 in a state where the axle fastener 38 and the biasing element 40 are inserted into the axle-fastener receiving opening 34.

The axle fastener 38 includes a fastener body 42 having a splined portion 44. The splined portion 44 is configured to engage with the splined end 24 of the crank axle 14 in the mounted state where the crank arm 12 is mounted to the crank axle 14. The splined portion 44 is configured to engage with the splined end 24 of the crank axle 14 in a state where the splined inner periphery 26 engages with the splined end 24 of the crank axle 14.

The biasing element 40 is configured to bias the axle fastener 38 in a biasing direction D3 parallel to the second opening axis A3. The biasing element 40 is contactable with one end of the fastener body 42 of the axle fastener 38 to bias the fastener body 42 of the axle fastener 38 in the biasing direction D3. The biasing element 40 is configured to apply biasing force F1 to the axle fastener 38 in the biasing direction D3. The biasing element 40 is configured to bias the crank axle 14 via the axle fastener 38 in a rotational biasing direction D4.

In the first embodiment, the biasing direction D3 is a direction opposite to the rotational driving direction D1 of the crank arm 12. The rotational biasing direction D4 is a direction opposite to the rotational driving direction D1 of the crank arm 12. However, the biasing direction D3 can be the same direction as the rotational driving direction D1 of the crank arm 12 if needed and/or desired. The biasing direction D3 can be a direction which is not along the rotational driving direction D1 of the crank arm 12 if needed and/or desired. The rotational biasing direction D4 can be the same direction as the rotational driving direction D1 of the crank arm 12 if needed and/or desired.

As seen in FIG. 5, the biasing element 40 has external threads 40A. The arm body 16 has internal threads 34A formed in the axle-fastener receiving opening 34. The internal threads 34A is configured to threadedly engage with the external threads 40A of the biasing element 40.

The biasing element 40 includes a tool engagement part 40B with which a tool is to engage to rotate the biasing element 40 relative to the arm body 16. The tool engagement part 40B includes a tool engagement hole 40C such as a hexagonal socket. In the first embodiment, the biasing element 40 includes a hexagon socket screw having the external threads 40A. Thus, the biasing element 40 can also be referred to as a biasing screw or biasing bolt 40. However, the biasing element 40 can include other structures instead of or in addition to a screw if needed and/or desired.

As seen in FIG. 5, the axle-fastener receiving opening 34 includes an insertion hole 34B and a threaded hole 34C. For example, the insertion hole 34B includes an unthreaded hole. The insertion hole 34B is partly in communication with the crank-axle receiving opening 22 by the connection opening 36. The internal threads 34A define the threaded hole 34C. The threaded hole 34C is in communication with the insertion hole 34B. The external threads 40A of the biasing element 40 is configured to engage with the threaded hole 34C of the axle-fastener receiving opening 34. The axle fastener 38 is configured to be provided in the insertion hole 34B of the axle-fastener receiving opening 34.

In the first embodiment, the second opening axis A3 is spaced apart from the first opening axis A2. The second opening axis A3 is defined along a tangent of a circumferential direction D6 with respect to the first opening axis A2. However, the positional relationship between the first opening axis A2 and the second opening axis A3 is not limited to the illustrated relationship.

As seen in FIG. 5, the splined portion 44 includes at least one internal spline tooth 44A. In the first embodiment, the splined portion 44 includes a plurality of internal spline teeth 44A circumferentially arranged about the first opening axis A2. The plurality of internal spline teeth 44A of the splined portion 44 is configured to mesh with the plurality of external teeth 24A of the splined end 24 of the crank axle 14.

As seen in FIGS. 3 and 5, in the first embodiment, a total number of the plurality of internal spline teeth 44A of the splined portion 44 is different from the total number of the plurality of external teeth 24A of the splined end 24. The total number of the plurality of internal spline teeth 44A of the splined portion 44 is less than the total number of the plurality of external teeth 24A of the splined end 24. The total number of the plurality of internal spline teeth 44A of the splined portion 44 is six while the total number of the plurality of external teeth 24A of the splined end 24 is 38. However, the total number of the plurality of internal spline teeth 44A of the splined portion 44 can be greater than or equal to the total number of the plurality of external teeth 24A of the splined end 24 if needed and/or desired. The total number of the plurality of internal spline teeth 44A of the splined portion 44 is not limited to the above number.

As seen in FIGS. 3 and 5, in the first embodiment, the total number of the plurality of internal spline teeth 44A of the splined portion 44 is different from the total number of the plurality of internal teeth 26A of the splined inner periphery 26. The total number of the plurality of internal spline teeth 44A of the splined portion 44 is less than the total number of the plurality of internal teeth 26A of the splined inner periphery 26. The total number of the plurality of internal spline teeth 44A of the splined portion 44 is six while the total number of the plurality of internal teeth 26A of the splined inner periphery 26 is 38. However, the total number of the plurality of internal spline teeth 44A of the splined portion 44 can be greater than or equal to the total number of the plurality of internal teeth 26A of the splined inner periphery 26 if needed and/or desired. The total number of the plurality of internal spline teeth 44A of the splined portion 44 is not limited to the above number.

As seen in FIG. 3, the plurality of external teeth 24A of the splined end 24 includes a first external tooth 24A1, a plurality of second external teeth 24A2, and a third external tooth 24A3. Each of the first external tooth 24A1 and the third external tooth 24A3 has a circumferential width different from a circumferential width of the second external tooth 24A2. The circumferential width of each of the first external tooth 24A1 and the third external tooth 24A3 is larger than the circumferential width of the second external tooth 24A2. However, the circumferential width of at least one of the first external tooth 24A1 and the third external tooth 24A3 can be smaller than or equal to the circumferential width of the second external tooth 24A2 if needed and/or desired. In the first embodiment, the circumferential width of the first external tooth 24A1 is equal to the circumferential width of the third external tooth 24A3. However, the circumferential width of the first external tooth 24A1 can be different from the circumferential width of the third external tooth 24A3.

Figure 6:
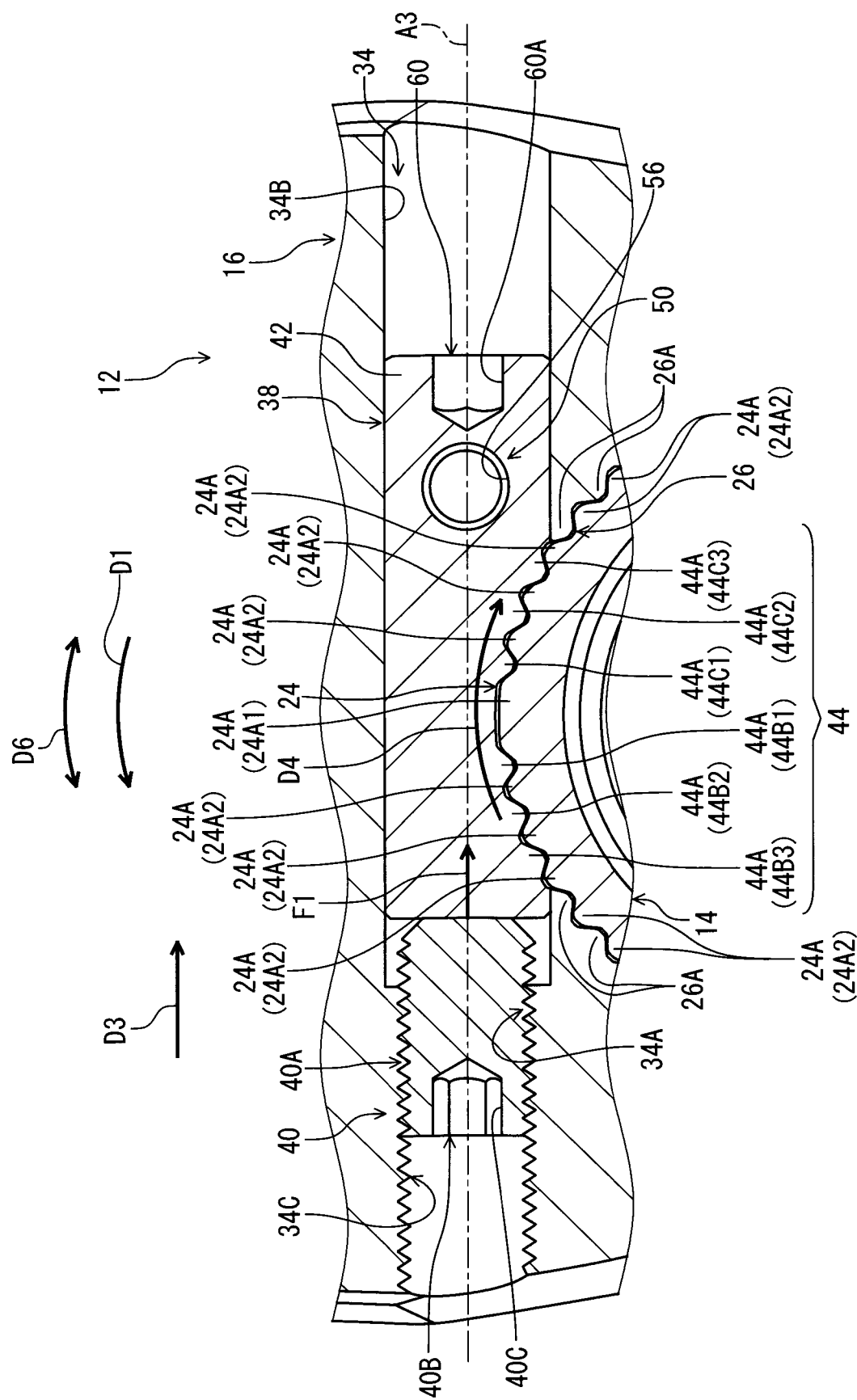
FIG. 6 is a cross-sectional view of the crank assembly taken along line VI-VI of FIG. 9.

As seen in FIG. 6, the plurality of internal spline teeth 44A includes a first internal spline tooth 44B1, a first internal spline tooth 44C1, a second internal spline tooth 44B2, a second internal spline tooth 44C2, a third internal spline tooth 44B3, and a third internal spline tooth 44C3. The first external tooth 24A1 is provided between the first internal spline tooth 44B1 and the first internal spline tooth 44C1 in a state where the splined portion 44 of the axle fastener 38 engages with the splined end 24 of the crank axle 14. One tooth of the plurality of second external teeth 24A2 is provided between the first internal spline tooth 44B1 and the second internal spline tooth 44B2 in the state where the splined portion 44 of the axle fastener 38 engages with the splined end 24 of the crank axle 14. Another tooth of the plurality of second external teeth 24A2 is provided between the second internal spline tooth 44B2 and the third internal spline tooth 44B3 in the state where the splined portion 44 of the axle fastener 38 engages with the splined end 24 of the crank axle 14. Another tooth of the plurality of second external teeth 24A2 is provided between the first internal spline tooth 44C1 and the second internal spline tooth 44C2 in the state where the splined portion 44 of the axle fastener 38 engages with the splined end 24 of the crank axle 14. Another tooth of the plurality of second external teeth 24A2 is provided between the second internal spline tooth 44C2 and the third internal spline tooth 44C3 in the state where the splined portion 44 of the axle fastener 38 engages with the splined end 24 of the crank axle 14.

Figure 7:
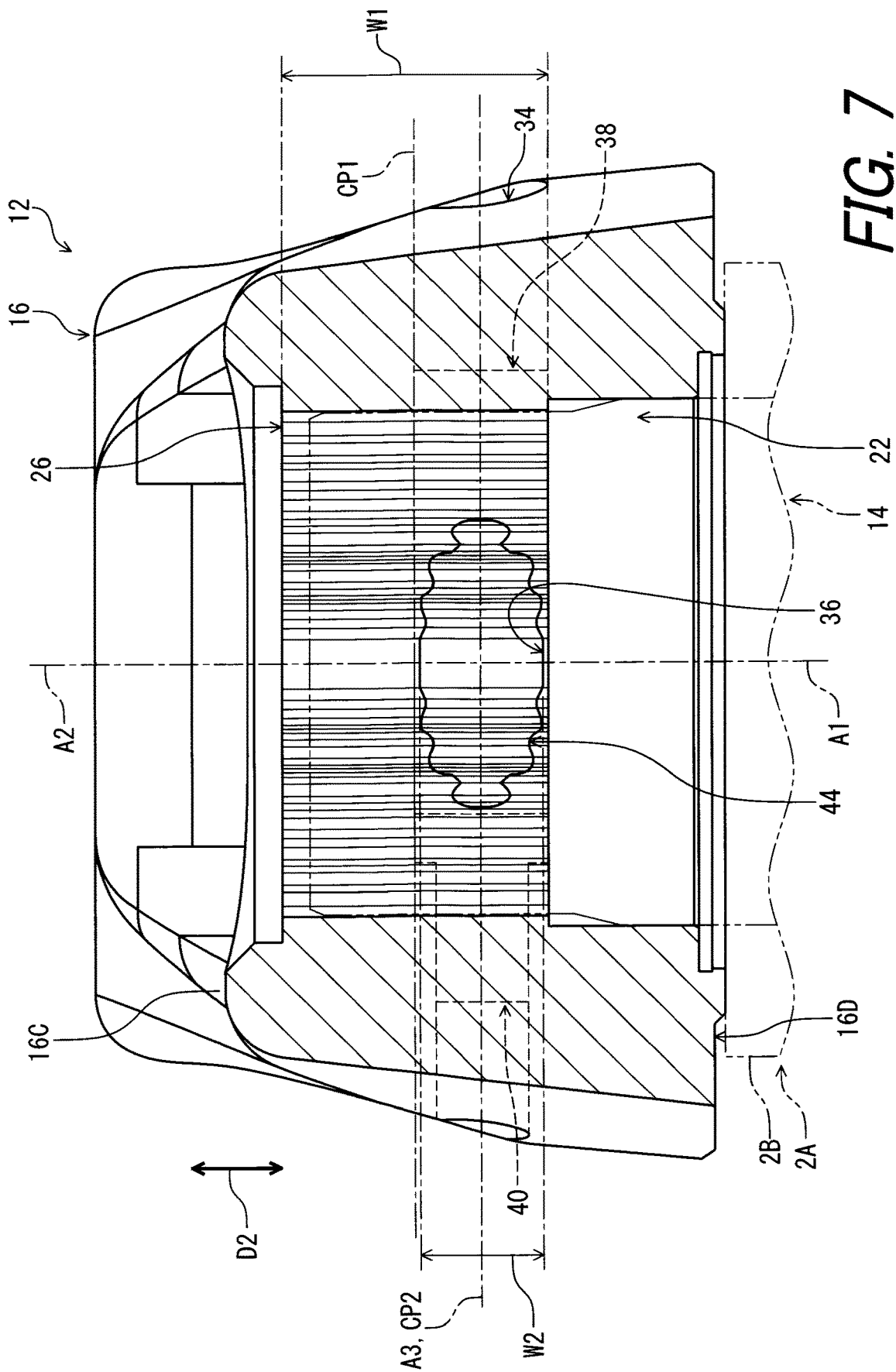
FIG. 7 is a cross-sectional view of the crank assembly taken along line VII-VII of FIG. 8.

As seen in FIG. 7, the splined portion 44 of the fastener body 42 is configured to overlap with the connection opening 36 in the inserted state where the axle fastener 38 is inserted into the axle-fastener receiving opening 34, so as to engage with the splined end 24 of the crank axle 14. The splined portion 44 of the fastener body 42 is configured to be exposed to the crank-axle receiving opening 22 through the connection opening 36 so as to engage with the splined end 24 of the crank axle 14 in the inserted state.

The splined inner periphery 26 has a first axial width W1 defined in the axial direction D2. The splined inner periphery 26 has a first reference center plane CP1 defined to bisect the first axial width W1 in the axial direction D2. The first reference center plane CP1 is perpendicular to the first opening axis A2.

The connection opening 36 has a second axial width W2 defined in the axial direction D2. The connection opening 36 has a second reference center plane CP2 defined to bisect the second axial width W2 in the axial direction D2. The second reference center plane CP2 is perpendicular to the first opening axis A2 and parallel to the second opening axis A3.

The arm body 16 includes a first axial surface 16C and a second axial surface 16D. The second axial surface 16D is provided on a reverse side of the first axial surface 16C in the axial direction D2. The second axial surface 16 D is closer to the bottom bracket 2B of the vehicle body 2A than the first axial surface 16C in the axial direction D2.

In the first embodiment, the second opening axis A3 is offset from the first reference center plane CP1 of the splined inner periphery 26 in the axial direction D2. The second reference center plane CP2 is offset from the first reference center plane CP1 of the splined inner periphery 26 in the axial direction D2. The second opening axis A3 is provided on the second reference center plane CP2.

The second opening axis A3 and the second reference center plane CP2 are offset from the first reference center plane CP1 of the splined inner periphery 26 in the axial direction D2 toward the second axial surface 16D. The second opening axis A3 and the second reference center plane CP2 are provided between the first reference center plane CP1 and the second axial surface 16D in the axial direction D2.

However, at least one of the second opening axis A3 and the second reference center plane CP2 can be offset from the first reference center plane CP1 of the splined inner periphery 26 in the axial direction D2 toward the first axial surface 16C if needed and/or desired.

At least one of the second opening axis A3 and the second reference center plane CP2 can be provided between the first reference center plane CP1 and the first axial surface 16C in the axial direction D2 if needed and/or desired. At least one of the second opening axis A3 and the second reference center plane CP2 can be provided on the first reference center plane CP1 of the splined inner periphery 26 in the axial direction D2 if needed and/or desired. The second opening axis A3 can be offset from the second reference center plane CP2 in the axial direction D2 if needed and/or desired.

Figure 8:
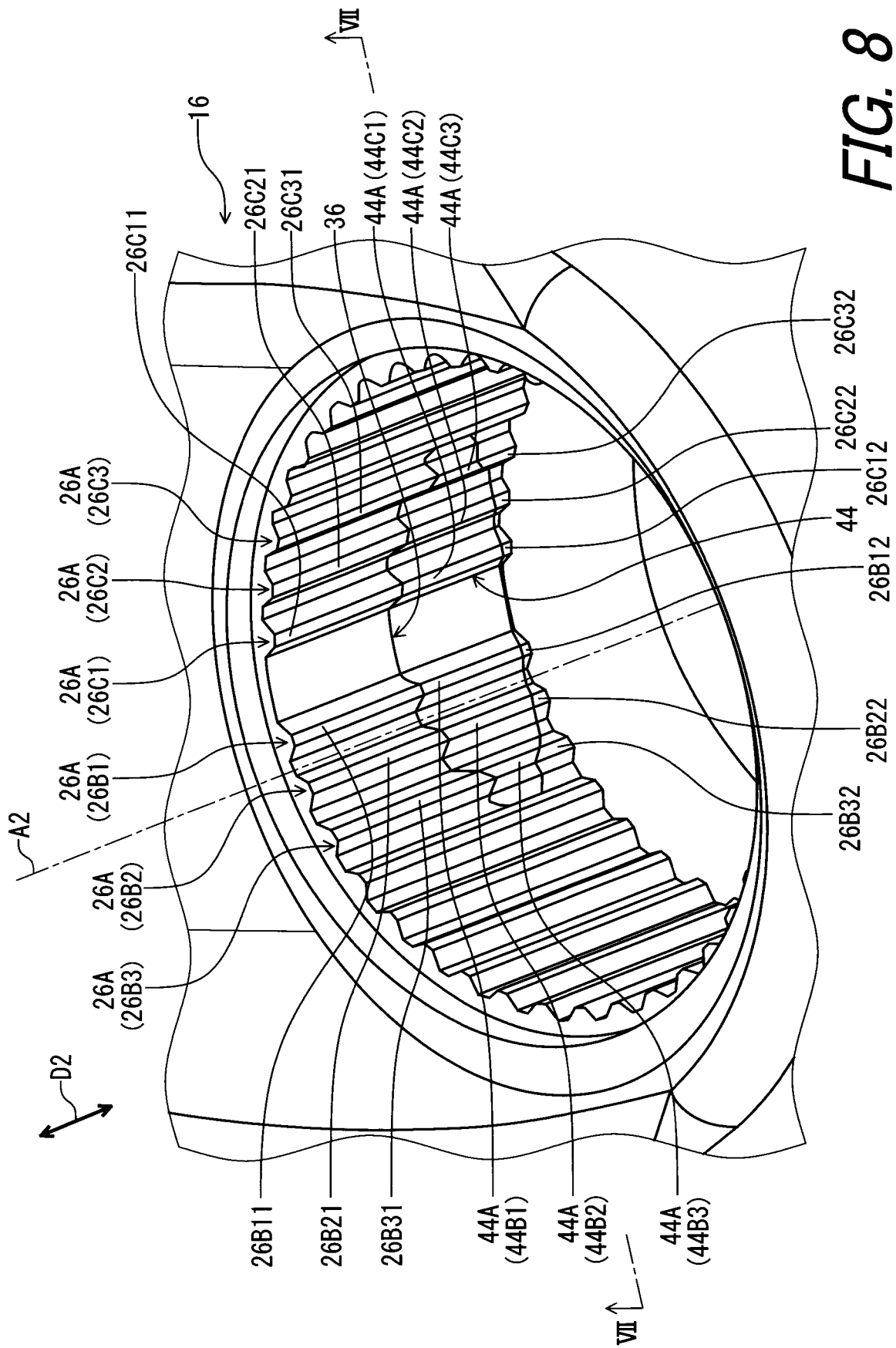
FIG. 8 is a perspective view of the crank arm of the crank assembly illustrated in FIG. 1.

As seen in FIG. 8, the plurality of internal teeth 26A includes a first internal tooth 26B1, a first internal tooth 26C1, a second internal tooth 26B2, a second internal tooth 26C2, a third internal tooth 26B3, and a third internal tooth 26C3.

The first internal tooth 26B1 is provided in a circumferential position which is the same as a circumferential position of the first internal spline tooth 44B1 of the splined portion 44. The first internal tooth 26B1 and the first internal spline tooth 44B1 constitute a single spline tooth.

The first internal tooth 26C1 is provided in a circumferential position which is the same as a circumferential position of the first internal spline tooth 44C1 of the splined portion 44. The first internal tooth 26C1 and the first internal spline tooth 44C1 constitute a single spline tooth.

The second internal tooth 26B2 is provided in a circumferential position which is the same as a circumferential position of the second internal spline tooth 44B2 of the splined portion 44. The second internal tooth 26B2 and the second internal spline tooth 44B2 constitute a single spline tooth.

The second internal tooth 26C2 is provided in a circumferential position which is the same as a circumferential position of the second internal spline tooth 44C2 of the splined portion 44. The second internal tooth 26C2 and the second internal spline tooth 44C2 constitute a single spline tooth.

The third internal tooth 26B3 is provided in a circumferential position which is the same as a circumferential position of the third internal spline tooth 44B3 of the splined portion 44. The third internal tooth 26B3 and the third internal spline tooth 44B3 constitute a single spline tooth.

The third internal tooth 26C3 is provided in a circumferential position which is the same as a circumferential position of the third internal spline tooth 44C3 of the splined portion 44. The third internal tooth 26C3 and the third internal spline tooth 44C3 constitute a single spline tooth.

The first internal tooth 26B1 is divided into first teeth 26B11 and 26B12 by the connection opening 36. The first internal tooth 26C1 is divided into first teeth 26C11 and 26C12 by the connection opening 36. The second internal tooth 26B2 is divided into second teeth 26B21 and 26B22 by the connection opening 36. The second internal tooth 26C2 is divided into second teeth 26C21 and 26C22 by the connection opening 36. The third internal tooth 26B3 is divided into third teeth 26B31 and 26B32 by the connection opening 36. The third internal tooth 26C3 is divided into third teeth 26C31 and 26C32 by the connection opening 36.

The first internal spline tooth 44B1 is provided between the first teeth 26B11 and 26B12 in the axial direction D2 to constitute the single spline tooth. The first internal spline tooth 44C1 is provided between the first teeth 26C11 and 26C12 in the axial direction D2 to constitute the single spline tooth. The second internal spline tooth 44B2 is provided between the second teeth 26B21 and 26B22 in the axial direction D2 to constitute the single spline tooth. The second internal spline tooth 44C2 is provided between the second teeth 26C21 and 26C22 in the axial direction D2 to constitute the single spline tooth. The third internal spline tooth 44B3 is provided between the third teeth 26B31 and 26B32 in the axial direction D2 to constitute the single spline tooth. The third internal spline tooth 44C3 is provided between the third teeth 26C31 and 26C32 in the axial direction D2 to constitute the single spline tooth.

Figure 9:
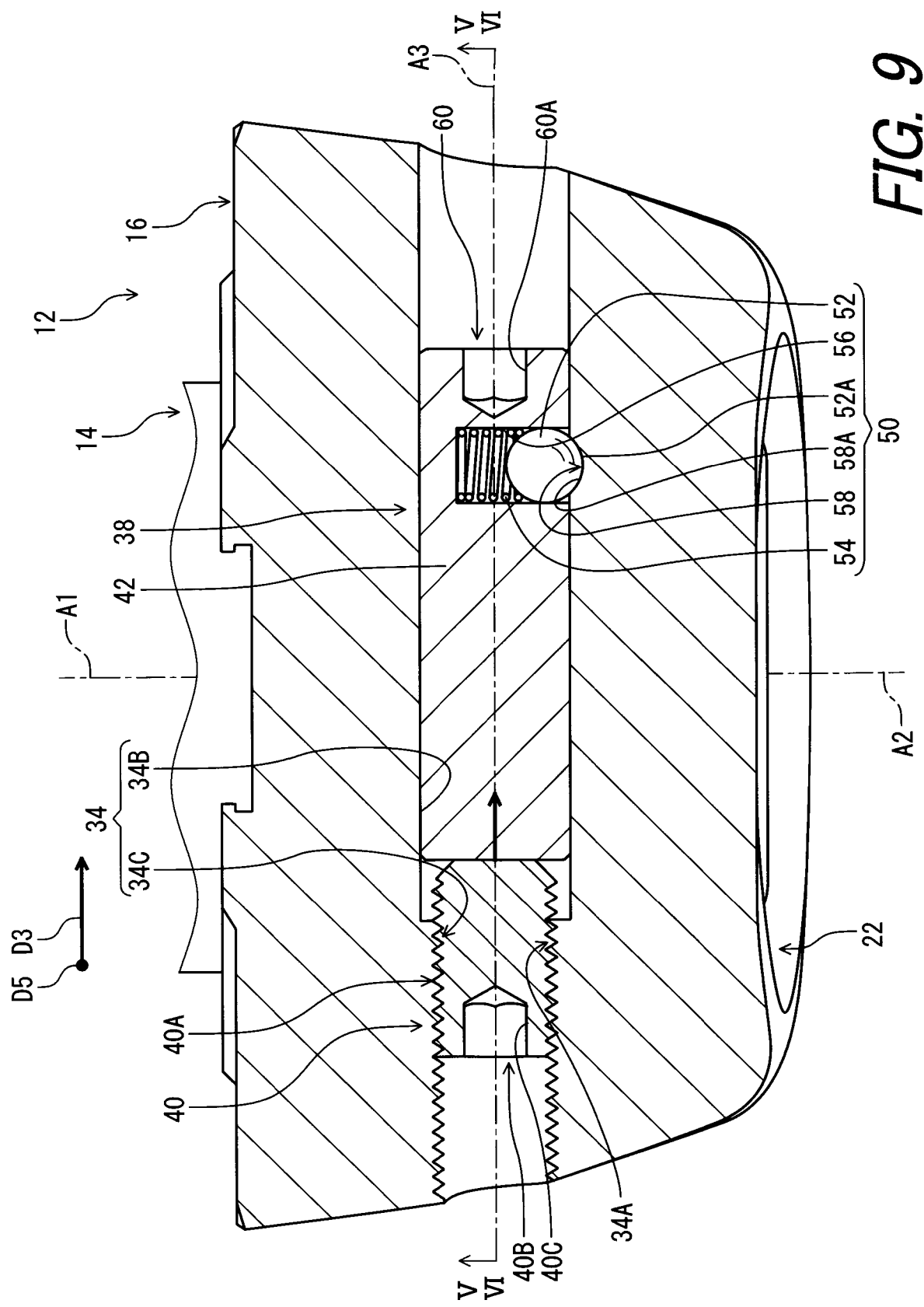
FIG. 9 is a cross-sectional view of the crank assembly taken along line IX-IX of FIG. 5.

As seen in FIG. 9, the first opening axis A2 of the crank-axle receiving opening 22 is non-parallel to the second opening axis A3 of the axle-fastener receiving opening 34 when viewed from a projective direction D5 (see e.g., FIG. 3) that is radially defined with respect to the first opening axis A2 and perpendicular to the second opening axis A3. The first opening axis A2 of the crank-axle receiving opening 22 is perpendicular to the second opening axis A3 of the axle-fastener receiving opening 34 when viewed from the projective direction D5 (see e.g., FIG. 5) that is radially defined with respect to the first opening axis A2 and perpendicular to the second opening axis A3.

The axle fastener 38 further includes a positioning structure 50 configured to position the fastener body 42 in the inserted state. In the first embodiment, the positioning structure 50 includes a movable member 52, a biasing member 54, and a receiving chamber 56.

The movable member 52 is movable relative to the fastener body 42. The movable member 52 is contactable with an inner peripheral surface of the insertion hole 34B of the axle-fastener receiving opening 34. In the first embodiment, the movable member 52 includes a curved convex surface 52A. The movable member 52 has a spherical shape. For example, the movable member 52 includes a ball. However, the movable member 52 can have other shapes if needed and/or desired.

As seen in FIG. 9, the biasing member 54 is configured to bias the movable member 52 in a direction away from the fastener body 42. The biasing member 54 is configured to radially outwardly bias the movable member 52 with respect to the second opening axis A3 in the inserted state. The receiving chamber 56 is formed to the fastener body 42 and is configured to receive the movable member 52 and the biasing member 54. The fastener body 42 includes the receiving chamber 56. The movable member 52 is movably provided in the receiving chamber 56. The biasing member 54 is provided in the receiving chamber 56 to bias the movable member 52. In the first embodiment, the biasing member 54 includes a spring such as a compression spring. However, the biasing member 54 can include other structures instead of or in addition to a spring if needed and/or desired.

The positioning structure 50 further includes a receiving recess 58 formed to the arm body 16 and configured to receive the movable member 52. The arm body 16 includes the receiving recess 58. The inner peripheral surface of the insertion hole 34B of the axle-fastener receiving opening 34 includes the receiving recess 58. The receiving recess 58 includes a curved concave surface 58A. However, the receiving recess 58 can have other shapes such as a groove if needed and/or desired.

The axle fastener 38 includes a tool engagement portion 60 with which a tool is to engage. The tool engagement portion 60 includes a tool engagement hole 60A such as a hexagonal socket. The tool engagement portion 60 is provided at an end of the fastener body 42 and is configured to allow the user to adjust a posture of the axle fastener 38 relative to the splined inner periphery 26 of the arm body 16 using a tool such as a hexagonal wrench.

Figure 10:
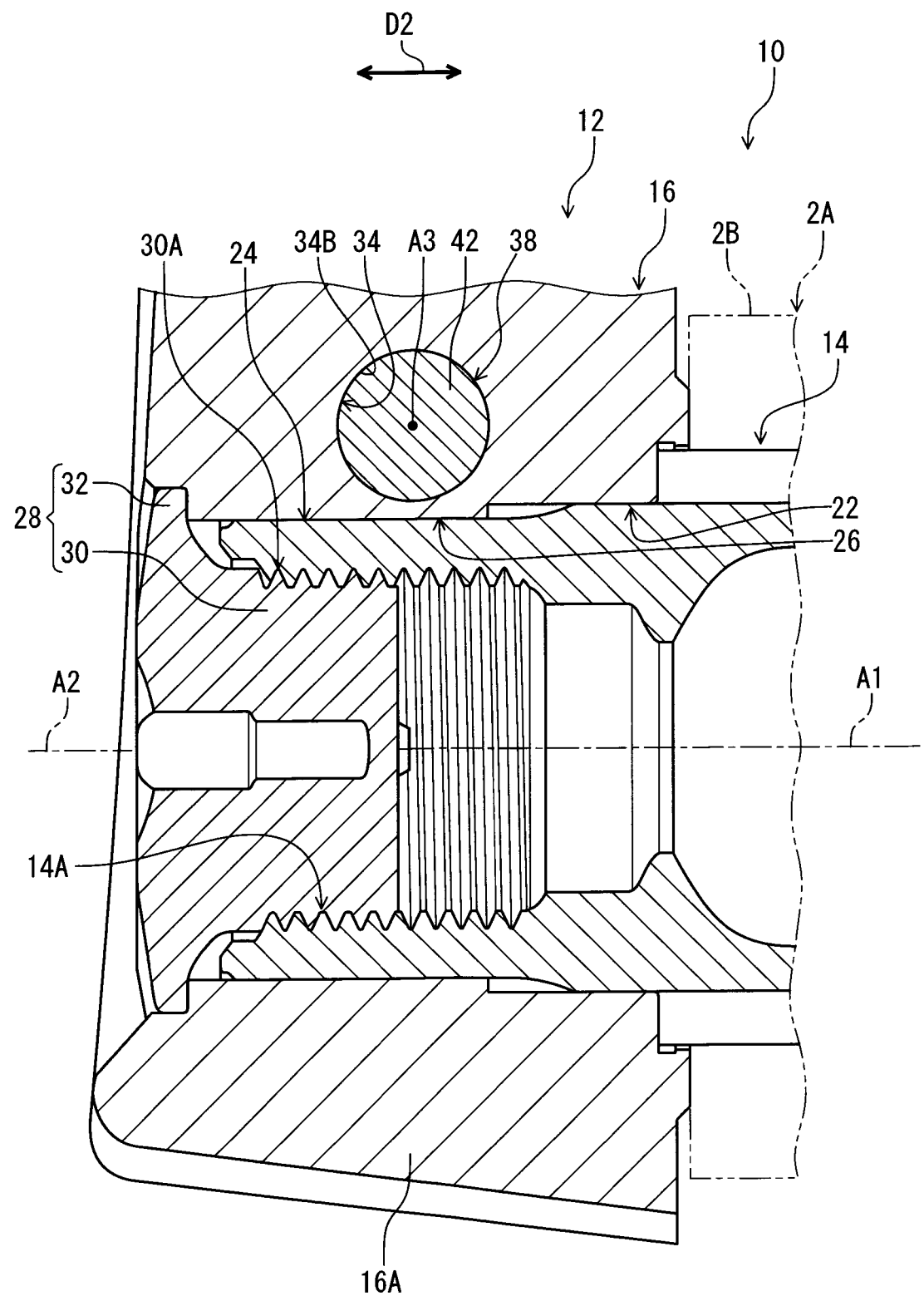
FIG. 10 is a cross-sectional view of the crank assembly taken along line X-X of FIG. 5.
Figure 11:
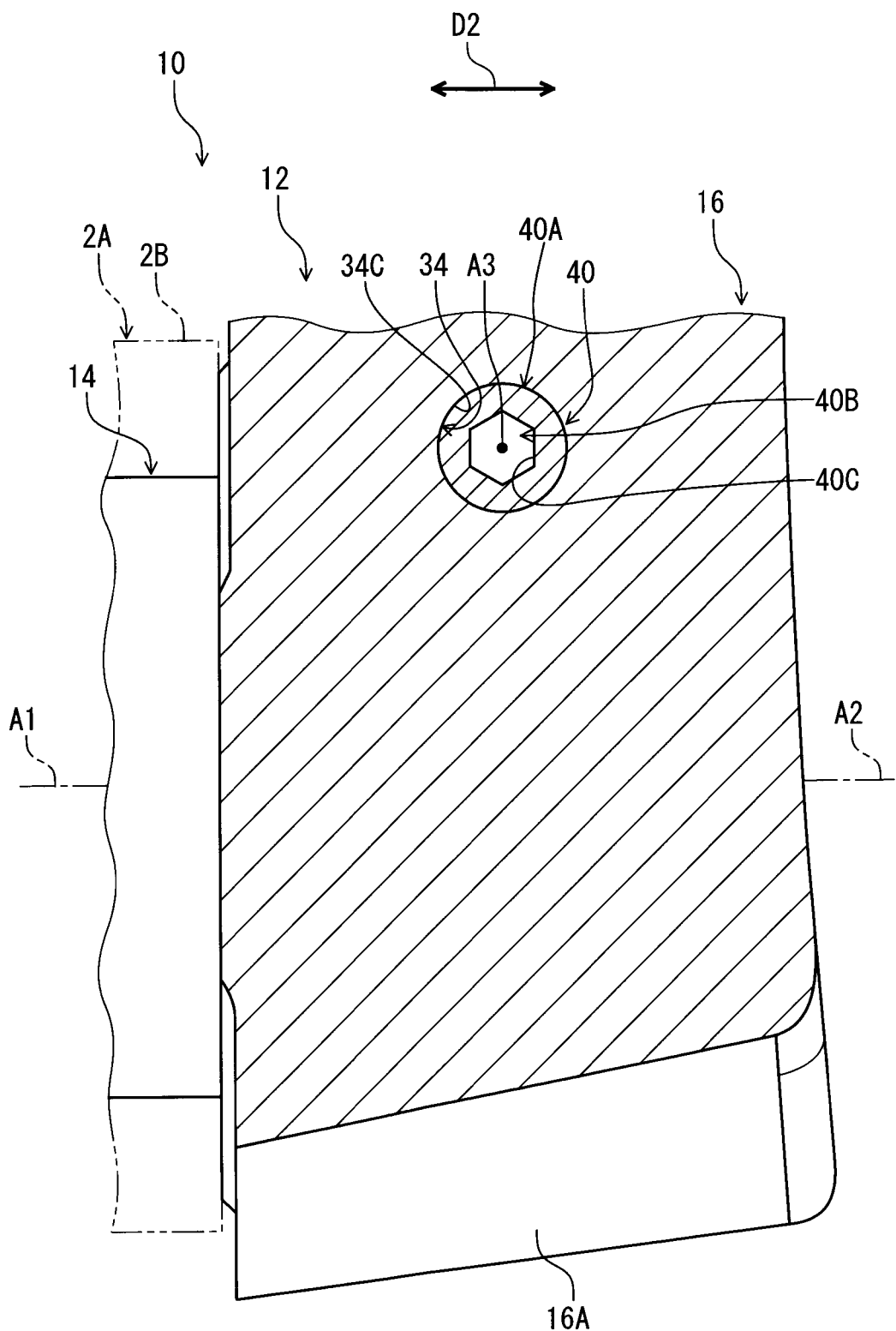
FIG. 11 is a cross-sectional view of the crank assembly taken along line XI-XI of FIG. 5.

As seen in FIGS. 10 and 11, the axle-fastener receiving opening 34 has a circular cross-section. As seen in FIG. 10, the insertion hole 34B of the axle-fastener receiving opening 34 has the circular cross-section. The fastener body 42 of the axle fastener 38 has a circular cross-section. As seen in FIG. 11, the threaded hole 34C of the axle-fastener receiving opening 34 has the circular cross-section. The biasing element 40 has a circular cross-section. However, the cross-section of the axle-fastener receiving opening 34 can have another shape such as a polygonal shape and an oval shape if needed and/or desired. The cross-section of the insertion hole 34B can have another shape such as a polygonal shape and an oval shape if needed and/or desired. The cross-section of the threaded hole 34C can have another shape such as a polygonal shape and an oval shape if needed and/or desired. The cross-section of the fastener body 42 of the axle fastener 38 can have another shape such as a polygonal shape and an oval shape if needed and/or desired. The cross-section of the biasing element 40 can have another shape such as a polygonal shape and an oval shape if needed and/or desired. The tool engagement portion 60 can be omitted from the axle fastener 38 if needed and/or desired.

Figure 12:
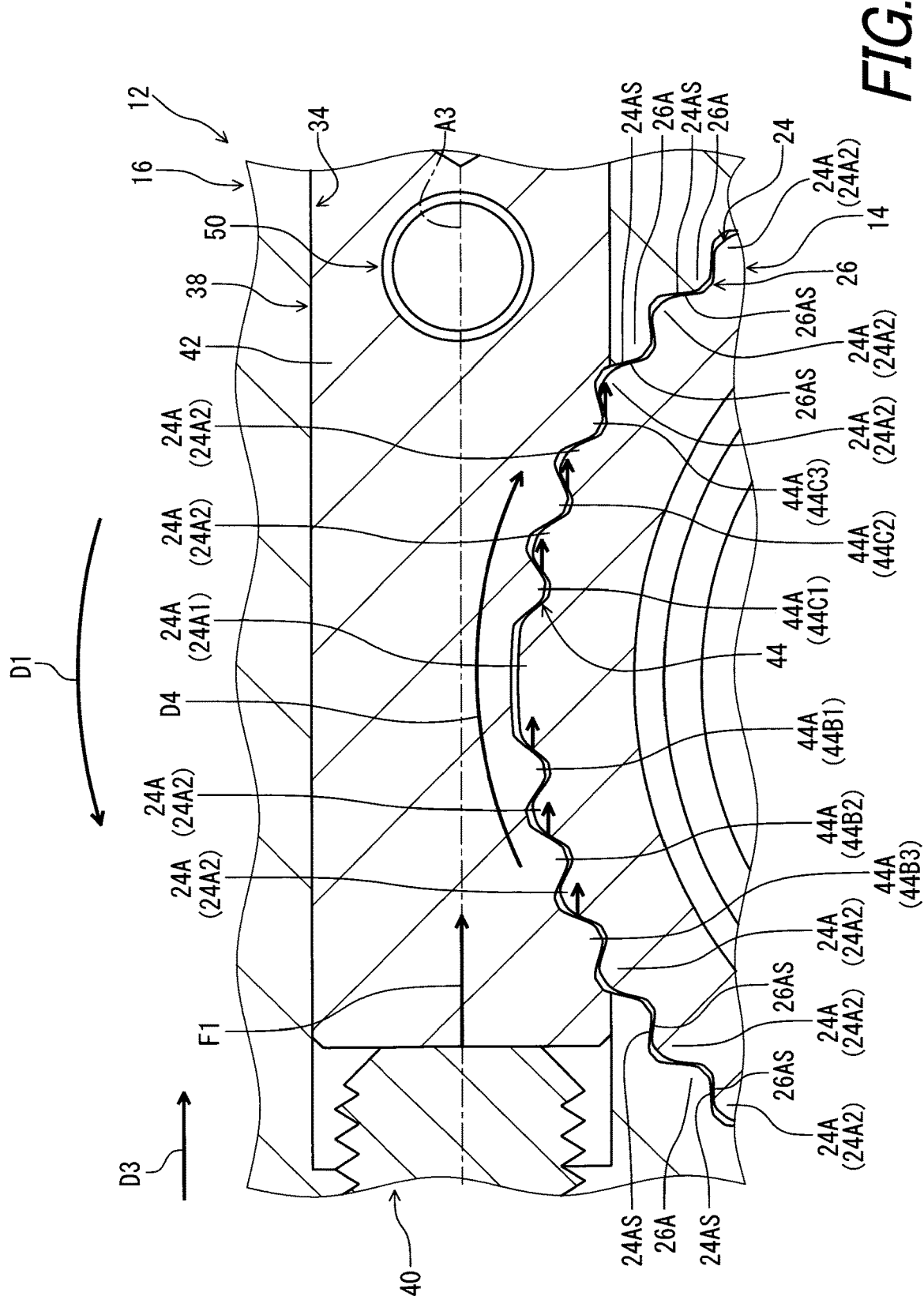
FIG. 12 is an enlarged cross-sectional view of the crank assembly illustrated in FIG. 6.

As seen in FIG. 12, the external tooth 24A of the splined end 24 includes a circumferential surface 24AS facing in a rotational direction opposite to the rotational driving direction D1. The circumferential surface 24AS faces in the rotational biasing direction D4. The internal tooth 26A of the splined inner periphery 26 includes a circumferential surface 26AS facing in the rotational driving direction D1. The circumferential surface 24AS of the external tooth 24A of the splined end 24 is contactable with the circumferential surface 26AS of the internal tooth 26A of the splined inner periphery 26. The biasing force F1 of the biasing element 40 biases the crank axle 14 relative to the arm body 16 via the splined portion 44 of the fastener body 42 in the rotational biasing direction D4. The biasing force F1 of the biasing element 40 presses the circumferential surface 24AS of the external tooth 24A against the circumferential surface 26AS of the internal tooth 26A. Thus, the biasing element 40 keeps the circumferential surface 24AS of the external tooth 24A of the crank axle 14 in contact with the circumferential surface 26AS of the internal tooth 26A of the arm body 16 in a state where the biasing element 40 biases the axle fastener 38 in the biasing direction D3. Accordingly, pedaling force applied to the arm body 16 is efficiently transmitted from the arm body 16 to the crank axle 14 via the splined inner periphery 26 of the arm body 16 and the splined end 24 of the crank axle 14.

Second Embodiment

A crank assembly 210 including a crank arm 212 in accordance with a second embodiment will be described below referring to FIGS. 13 to 15. The crank arm 212 has the same structure and/or configuration as those of the crank arm 12 except for the axle fastener. Thus, elements having substantially the same function as those in the first embodiment will be numbered the same here and will not be described and/or illustrated again in detail here for the sake of brevity.

Figure 13:
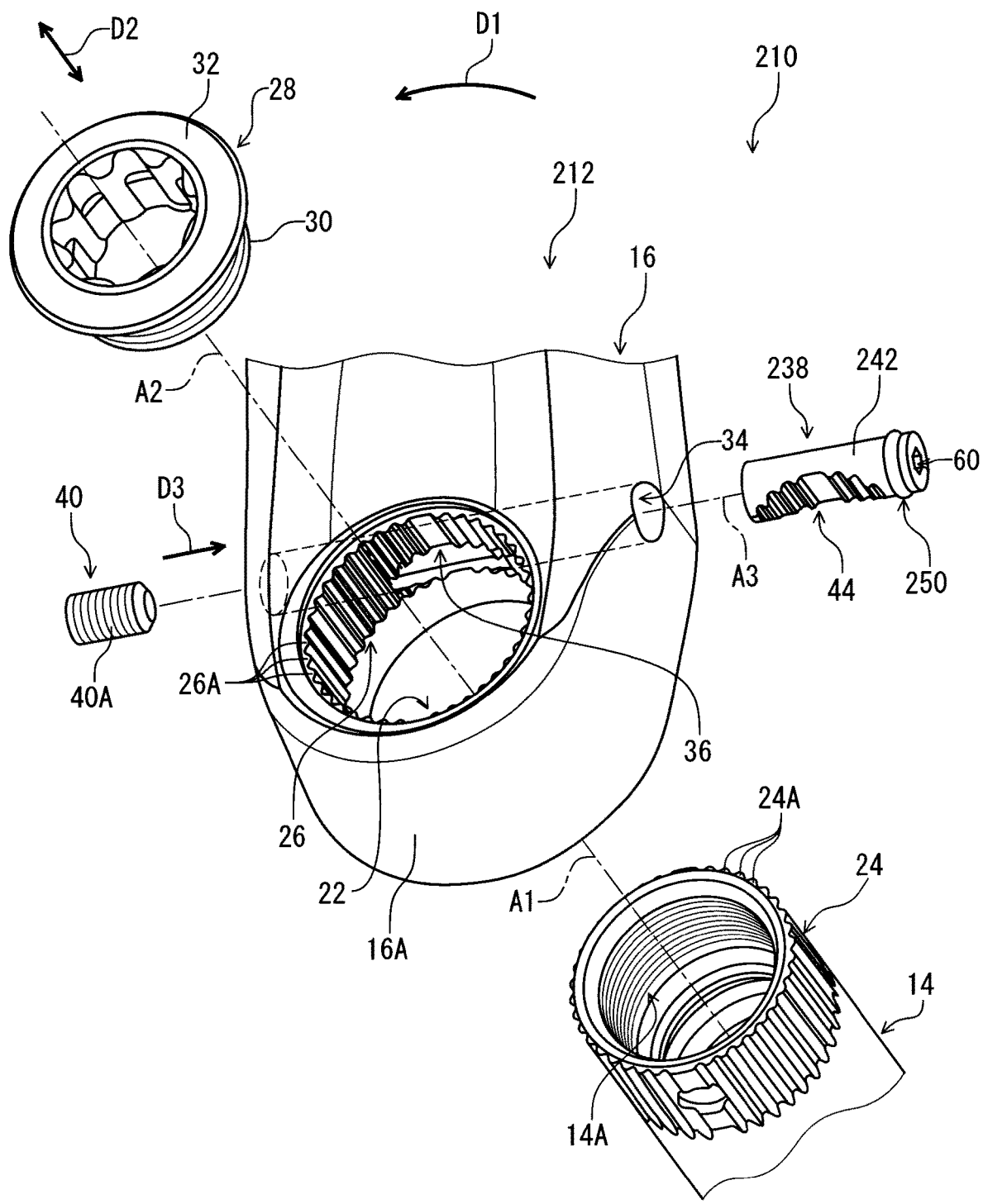
FIG. 13 is an exploded perspective view of a crank assembly including a crank arm in accordance with a second embodiment.

As seen in FIG. 13, the crank arm 212 for the crank assembly 210 of the human powered vehicle 2 comprises the arm body 16, an axle fastener 238, and the biasing element 40. The crank arm 212 further comprises the axle bolt 28. The axle fastener 238 has substantially the same structure as the structure of the axle fastener 38 described in the first embodiment.

Figure 14:
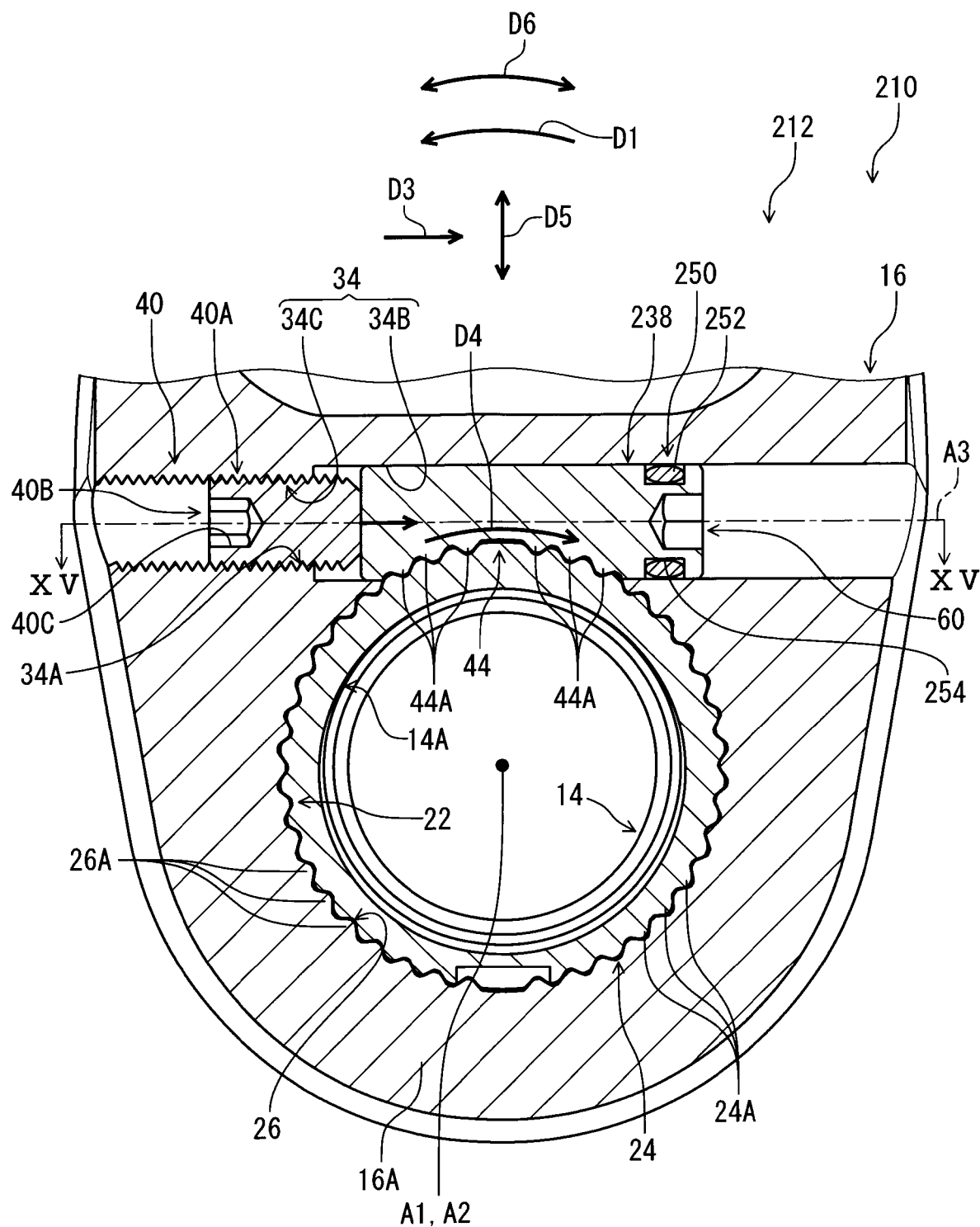
FIG. 14 is a cross-sectional view of the crank assembly taken along line XIV-XIV of FIG. 15.

As seen in FIG. 14, the axle fastener 238 is configured to be inserted into the axle-fastener receiving opening 34. The axle fastener 238 is configured to engage with the splined end 24 of the crank axle 14 in an inserted state where the axle fastener 238 is inserted into the axle-fastener receiving opening 34.

In the second embodiment, the axle fastener 238 includes a fastener body 242 having the splined portion 44. The splined portion 44 is configured to engage with the splined end 24 of the crank axle 14 in the mounted state where the crank arm 212 is mounted to the crank axle 14. The fastener body 242 has substantially the same structure as the structure of the fastener body 42 described in the first embodiment.

The biasing element 40 is configured to bias the axle fastener 238 in the biasing direction D3 parallel to the second opening axis A3. The biasing element 40 is contactable with one end of the fastener body 242 of the axle fastener 238 to bias the fastener body 242 of the axle fastener 238 in the biasing direction D3. The biasing element 40 is configured to bias the crank axle 14 via the axle fastener 238 in the rotational biasing direction D4.

Figure 15:
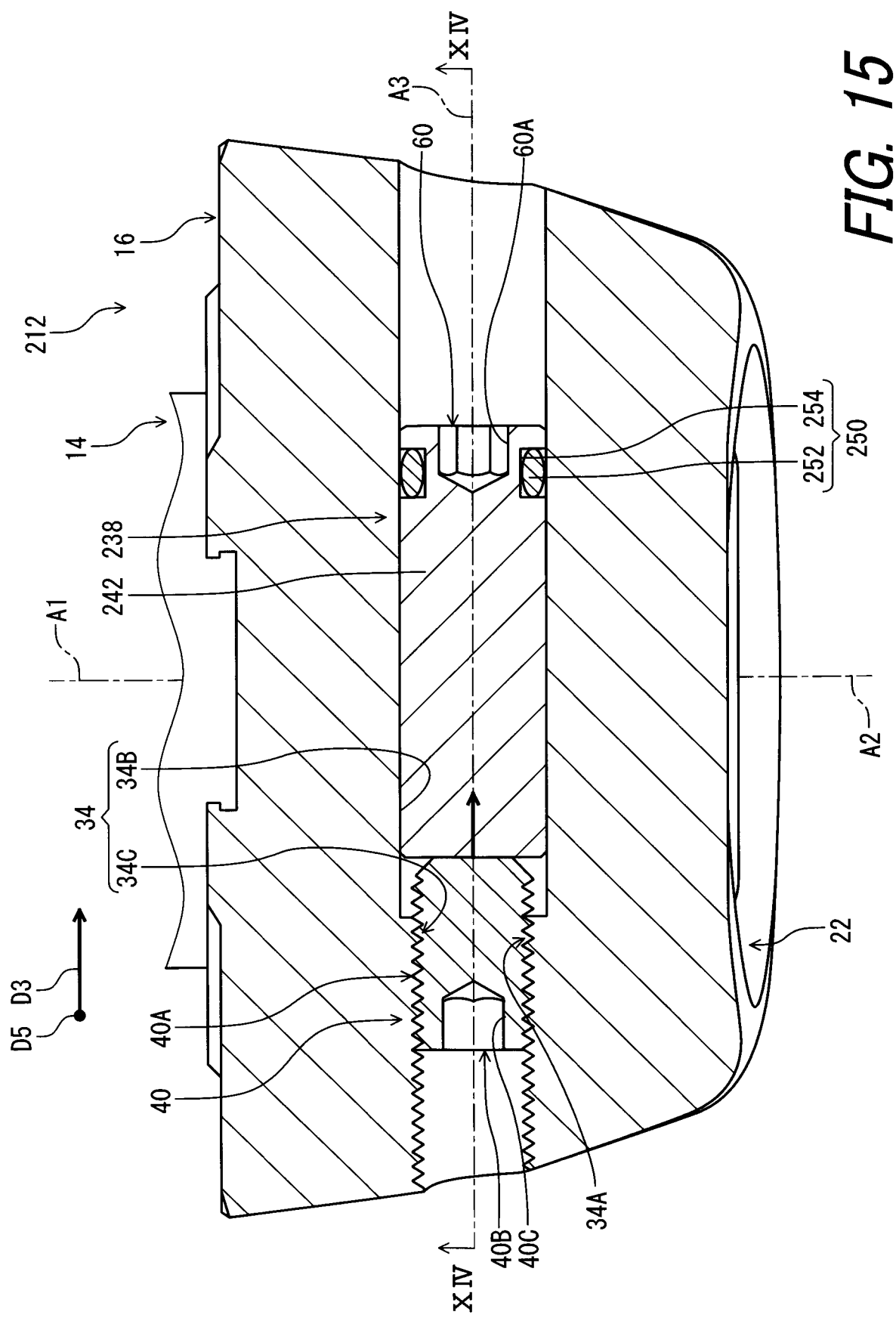
FIG. 15 is a cross-sectional view of the crank assembly taken along line XV-XV of FIG. 14.

As seen in FIG. 15, the axle fastener 238 further includes a positioning structure 250 configured to position the fastener body 242 in the inserted state. In the present embodiment, the positioning structure 250 includes an elastic ring 252 and an annular groove 254.

The annular groove 254 is formed to the fastener body 242 and is configured to receive the elastic ring 252. The elastic ring 252 is provided in the annular groove 254. The elastic ring 252 is contactable with the inner peripheral surface of the insertion hole 34B of the axle-fastener receiving opening 34.

The elastic ring 252 is made of an elastic material such as rubber. The elastic ring 252 is elastically deformed in the inserted state where the axle fastener 238 is inserted into the axle-fastener receiving opening 34. Thus, the positioning structure 250 is configured to apply resistance force to restrict the fastener body 242 from moving relative to the arm body 16. In the second embodiment, the receiving recess 58 described in the first embodiment is omitted from the arm body 16. However, the arm body 16 can include the receiving recess 58 as with the first embodiment if needed and/or desired.

Third Embodiment

A crank assembly 310 including a crank arm 312 in accordance with a third embodiment will be described below referring to FIG. 16. The crank arm 312 has the same structure and/or configuration as those of the crank arm 12 or 212 except for the axle fastener and the biasing element. Thus, elements having substantially the same function as those in the first and/or second embodiment will be numbered the same here and will not be described and/or illustrated again in detail here for the sake of brevity.

As seen in FIG. 5, in the first embodiment, the fastener body 42 of the axle fastener 38 is formed as a unitary, one-piece member. As seen in FIG. 13, in the second embodiment, the fastener body 242 of the axle fastener 238 is formed as a unitary, one-piece member. However, the fastener body 42 of the axle fastener 38 can include a plurality of separate parts if needed and/or desired. The fastener body 242 of the axle fastener 238 can include a plurality of separate parts if needed and/or desired.

Figure 16:
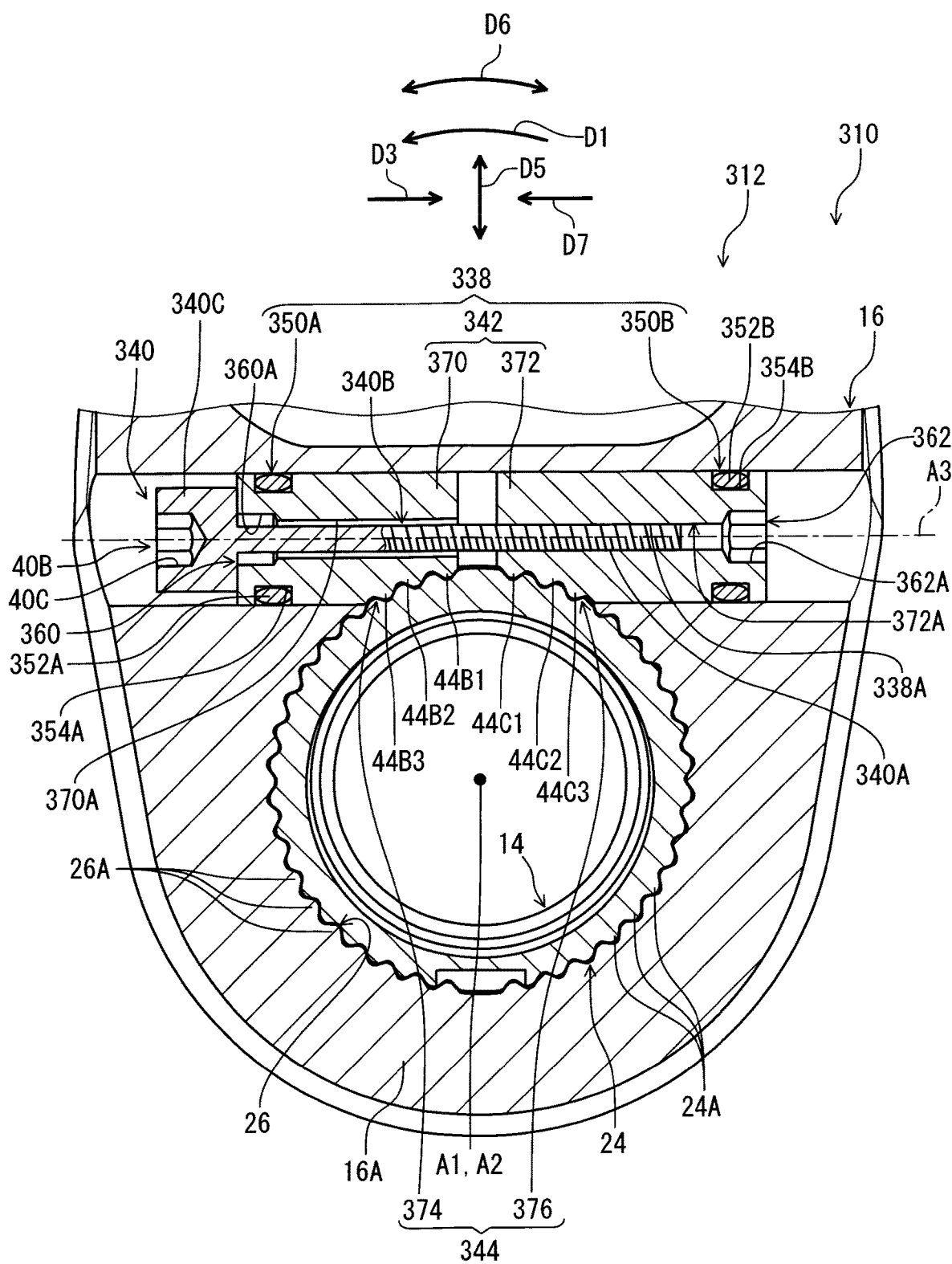
FIG. 16 is a cross-sectional view of a crank assembly including a crank arm in accordance with a third embodiment.

As seen in FIG. 16, the crank arm 312 for the crank assembly 310 of the human powered vehicle 2 comprises the arm body 16, an axle fastener 338, and a biasing element 340. The axle fastener 338 is configured to be inserted into the axle-fastener receiving opening 34. The axle fastener 338 includes a fastener body 342 having a splined portion 344. The splined portion 344 is configured to engage with the splined end 24 of the crank axle 14 in the mounted state where the crank arm 312 is mounted to the crank axle 14.

The fastener body 342 includes a first fastener body 370 and a second fastener body 372. The second fastener body 372 is a separate member from the first fastener body 370. The splined portion 344 includes a first splined portion 374 and a second splined portion 376. The second splined portion 376 is a separate member from the first splined portion 374. The first fastener body 370 includes the first splined portion 374. The second fastener body 372 includes the second splined portion 376.

The biasing element 340 is configured to bias the axle fastener 338 in the biasing direction D3 parallel to the second opening axis A3. The biasing element 340 is contactable with one end of the fastener body 342 of the axle fastener 338 to bias the fastener body 342 of the axle fastener 338 in the biasing direction D3. The biasing element 340 is configured to bias the crank axle 14 via the axle fastener 338 in the rotational biasing direction D4.

The biasing element 340 is configured to bias the first fastener body 370 in the biasing direction D3. The biasing element 340 is contactable with one end of the first fastener body 370 to bias the fastener body 342 of the axle fastener 338 in the biasing direction D3. The biasing element 340 is configured to bias the second fastener body 372 in an additional biasing direction D7 opposite to the biasing direction D3.

The biasing element 340 has external threads 340A. The axle fastener 338 includes internal threads 338A configured to threadedly engage with the external threads 340A of the biasing element 340. The second fastener body 372 includes the internal threads 338A. The second fastener body 372 includes a threaded hole 372A extending along the second opening axis A3. The internal threads 338A defines the threaded hole 372A. The first fastener body 370 includes a hole 370A extending along the second opening axis A3. The hole 370A includes an unthreaded hole. The axle-fastener receiving opening 34 includes the insertion hole 34B. In the third embodiment, the axle-fastener receiving opening 34 is free of the internal threads 34A and the threaded hole 34C described in the first embodiment.

As seen in FIG. 16, the axle fastener 338 further includes a positioning structure 350A and/or 350B configured to position the fastener body 342 in the inserted state. The axle fastener 338 further includes the positioning structure 350A and the positioning structure 350B. The positioning structure 350A is configured to position the first fastener body 370 relative to the arm body 16 in the inserted state. The positioning structure 350B is configured to position the second fastener body 372 relative to the arm body 16 in the inserted state. Each of the positioning structures 350A and 350B has substantially the same structure as the structure of the positioning structure 250 described in the second embodiment. However, the positioning structure 50 described in the first embodiment can be applied to the axle fastener 338 instead of or in addition to the positioning structure 250 of the second embodiment if needed and/or desired.

In the third embodiment, the positioning structure 350A includes an elastic ring 352A and an annular groove 354A. The positioning structure 350B includes an elastic ring 352B and an annular groove 354B. Each of the elastic rings 352A and 352B has substantially the same structure as the structure of the elastic ring 252 described in the second embodiment. Each of the annular grooves 354A and 354B has substantially the same structure as the structure of the annular groove 254 described in the second embodiment.

The annular groove 354A is formed to the fastener body 342 and is configured to receive the elastic ring 352A. The first fastener body 370 includes the annular groove 354A. The elastic ring 352A is provided in the annular groove 354A. The elastic ring 352A is contactable with the inner peripheral surface of the insertion hole 34B of the axle-fastener receiving opening 34.

The annular groove 354B is formed to the fastener body 342 and is configured to receive the elastic ring 352B. The second fastener body 372 includes the annular groove 354B. The elastic ring 352B is provided in the annular groove 354B. The elastic ring 352B is contactable with the inner peripheral surface of the insertion hole 34B of the axle-fastener receiving opening 34.

The biasing element 340 includes the tool engagement part 40B including the tool engagement hole 40C. The biasing element 340 includes a rod 340B and a head 340C. The rod 340B includes the external threads 340A. The head 340C is provided at an end of the rod 340B. The rod 340B extends from the head 340C. The rod 340B extends through the hole 370A of first fastener body 370.

The axle fastener 338 includes a tool engagement portion 360 and/or 362 with which a tool is to engage. Each of the tool engagement portions 360 and 362 has substantially the same structure as the structure of the tool engagement portion 60 of the first and second embodiment.

The tool engagement portion 360 includes a tool engagement hole 360A such as a hexagonal socket. The tool engagement portion 360 is provided at an end of the first fastener body 370 and is configured to allow the user to adjust a posture of the first fastener body 370 relative to the splined inner periphery 26 of the arm body 16 using a tool such as a hexagonal wrench. The tool engagement hole 360A is in communication with the hole 370A. However, the tool engagement portion 360 can be omitted from the first fastener body 370 of the axle fastener 338 if needed and/or desired.

The tool engagement portion 362 includes a tool engagement hole 362A such as a hexagonal socket. The tool engagement portion 362 is provided at an end of the second fastener body 372 and is configured to allow the user to adjust a posture of the first fastener body 370 relative to the splined inner periphery 26 of the arm body 16 using a tool such as a hexagonal wrench. The tool engagement hole 362A is in communication with the threaded hole 372A. However, the tool engagement portion 362 can be omitted from the second fastener body 372 of the axle fastener 338 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A crank arm for a crank assembly of a human powered vehicle, comprising:
    an arm body including:
        a crank-axle receiving opening having a first opening axis and a splined inner periphery configured to receive and engage with a splined end of a crank axle; and
        an axle-fastener receiving opening having a second opening axis that is non-parallel to the first opening axis, the axle-fastener receiving opening being partly in communication with the crank-axle receiving opening by a connection opening;
    an axle fastener configured to be inserted into the axle-fastener receiving opening and including a fastener body having a splined portion, the splined portion being configured to engage with the splined end of the crank axle in a mounted state where the crank arm is mounted to the crank axle; and
    a biasing element configured to bias the axle fastener in a biasing direction parallel to the second opening axis,
    the splined portion of the fastener body being configured to overlap with the connection opening in an inserted state where the axle fastener is inserted into the axle-fastener receiving opening, so as to engage with the splined end of the crank axle.

2. The crank arm according to claim 1, wherein the first opening axis of the crank-axle receiving opening is perpendicular to the second opening axis of the axle-fastener receiving opening when viewed from a projective direction that is radially defined with respect to the first opening axis and perpendicular to the second opening axis.

3. The crank arm according to claim 1, further comprising:
    an axle bolt including:
        a bolt body having external threads configured to threadedly engage with internal threads of the crank axle in the mounted state; and
        a radial projection extending radially outwardly from the bolt body with respect to the first opening axis and configured to abut against the arm body in an axial direction with respect to the first opening axis in the mounted state.

4. The crank arm according to claim 1, wherein the axle fastener further includes a positioning structure configured to position the fastener body in the inserted state.

5. The crank arm according to claim 4, wherein the positioning structure includes:
    a movable member;
    a biasing member configured to bias the movable member in a direction away from the fastener body; and
    a receiving chamber formed to the fastener body and configured to receive the movable member and the biasing member.

6. The crank arm according to claim 5, wherein the positioning structure further includes a receiving recess formed to the arm body and configured to receive the movable member.

7. The crank arm according to claim 4, wherein the positioning structure includes:
    an elastic ring; and
    an annular groove formed to the fastener body and configured to receive the elastic ring.

8. The crank arm according to claim 1, wherein
the biasing direction is a direction opposite to a rotational driving direction of the crank arm.

9. The crank arm according to claim 1, wherein
the fastener body of the axle fastener is formed as a unitary, one-piece member.

10. The crank arm according to claim 9, wherein
the biasing element is contactable with one end of the fastener body of the axle fastener to bias the fastener body of the axle fastener in the biasing direction.

11. The crank arm according to claim 1, wherein
the biasing element has external threads, and
the arm body has internal threads formed in the axle-fastener receiving opening and configured to threadedly engage with the external threads of the biasing element.

\* \* \* \* \*